Dec. 26, 1933.        C. W. HANSELL        1,941,001
RECORDER
Filed Jan. 19, 1929        3 Sheets-Sheet 1

Inventor
CLARENCE W. HANSELL
By his Attorney

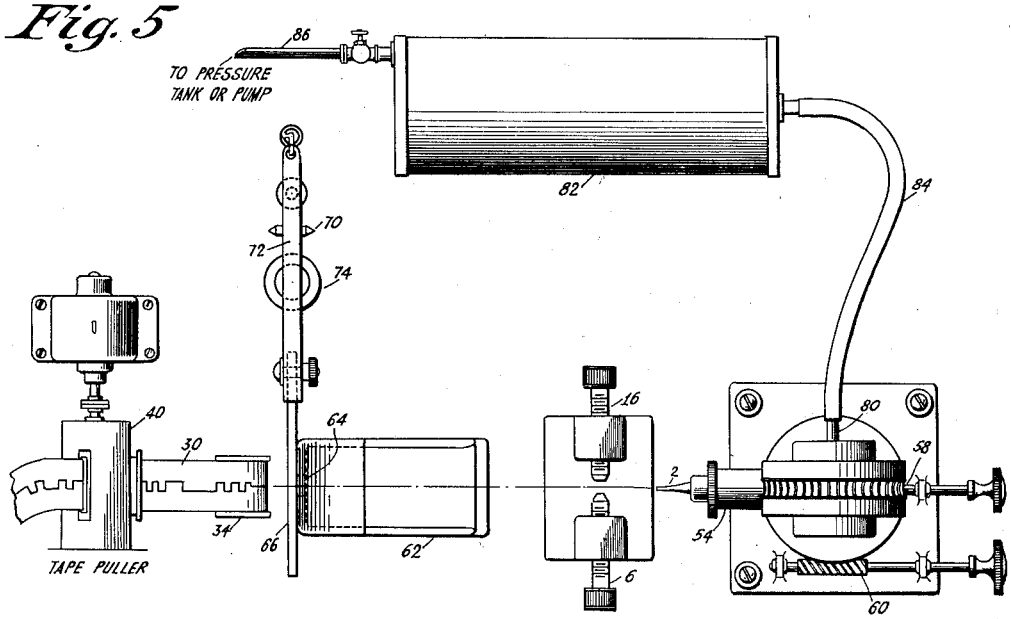
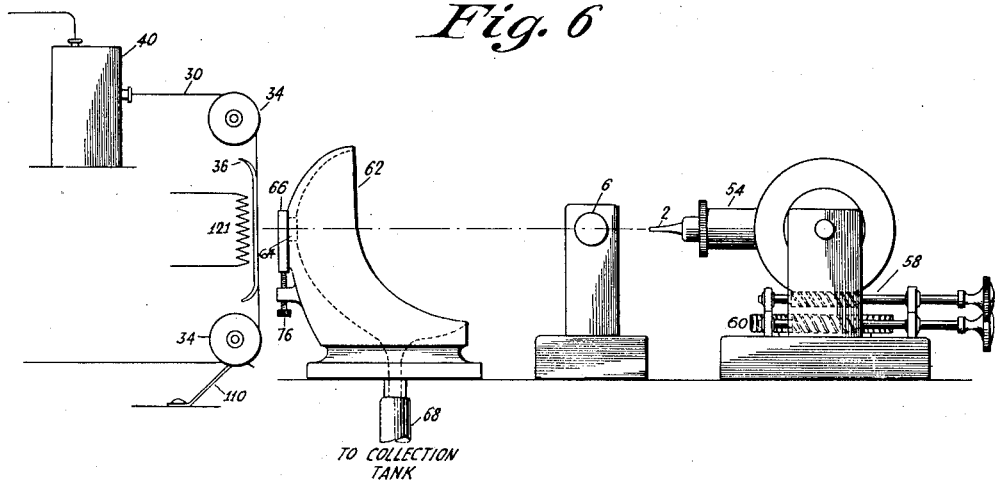
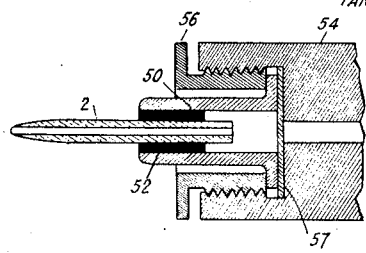

Dec. 26, 1933.     C. W. HANSELL     1,941,001
RECORDER
Filed Jan. 19, 1929     3 Sheets-Sheet 3
*Fig. 8*
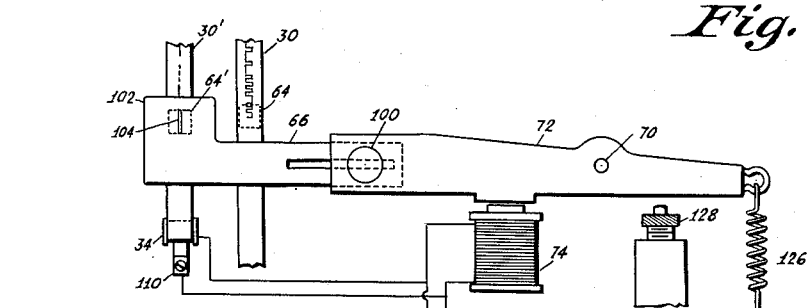
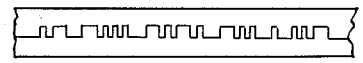
*Fig. 9*
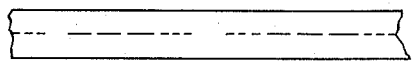
*Fig. 10*
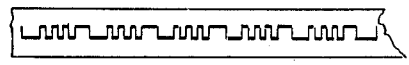
*Fig. 11*
*Fig. 12*  *Fig. 13* 
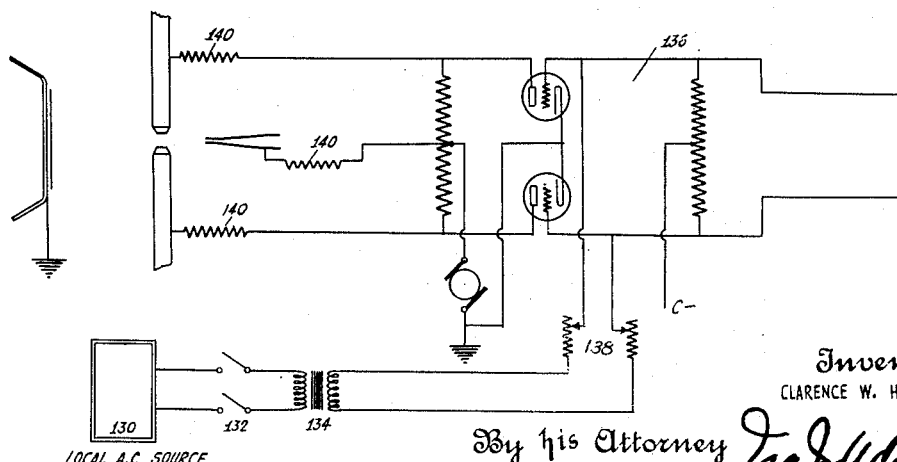
Inventor
CLARENCE W. HANSELL
By his Attorney Patented Dec. 26, 1933

1,941,001

UNITED STATES PATENT OFFICE 1,941,001

RECORDER

Clarence W. Hansell, Port Jefferson, N. Y., assignor to Radio Corporation of America, a corporation of Delaware Application January 19, 1929. Serial No. 333,617

52 Claims. (Cl. 178—88)

This invention relates to recorders, and more particularly to a method and means for recording signals at speeds ranging from the lowest to the highest which may now be anticipated in practice.

The usual type of general purpose oscillograph, using a mirror supported and rotated by a pair of taut conductors, is not truly aperiodic, and possesses the further disadvantage of having at most a limited size record sheet, which is not directly printed, but which must be photographically developed before its record is made visible. An object of my invention is to provide a direct recording and a more nearly aperiodic oscillograph, which I do by projecting an exceedingly fine stream of marking fluid on a moving record sheet, and deflecting the stream by electrostatic attraction exerted thereon in accordance with the electrical energy wave which is to be recorded.

The development of short wave transmitters and of special keying systems therefor has proceeded so rapidly that tremendously increased keying speeds have been made possible, so that the recorder, used at the receiver, has become a limiting factor in high speed operation. Radio circuits are already obtainable which may be run as high as 1200 words per minute, using code signals, and at an equivalent interruption period for facsimile and picture signals. For code signals the usual syphon recorder is favorably operated at 80 words per minute, and while special recorders have been run up to 250 words per minute, even these are clearly inadequate.

The primary object of my invention is to provide a high speed signal recorder, and this I do by projecting a stream of marking fluid on a record sheet, and controlling the stream by electrostatic attraction exerted directly on the marking fluid, in accordance with the signal to be recorded. The control, broadly, may be by partial deflection, total deflection, interruption, and so on. The stream is made exceedingly fine, being practically invisible until it strikes, and the control of the stream is preferably obtained, as in the case of the general purpose oscillograph already mentioned, by deflecting it by electrostatic attraction exerted in a normal direction on the unsupported stream, so that the operation is practically inertialess, and is adapted to extraordinarily high speeds.

To make the operation more positive, and the deflections of the stream instantaneous in either direction, is a further object of my invention, and this I do by providing a pair of electrodes on either side of the stream, and operating them in alternation. In this manner the stream is deflected in one direction in response to signal impulses of one polarity, and in opposite direction in response to signal impulses of opposite polarity. Actually the electrodes may be excited at the same or opposite polarity, but the excitation is alternate, and is opposite to that of the nozzle and stream, so that alternate attraction toward the electrodes results.

To avoid the possibility of splashing of the marking fluid on striking the record sheet is a further object of my invention, and to this end I cause the marking sheet to have a potential different from that of the marking fluid, preferably by so connecting a metallic platen behind the record sheet in circuit as will cause electrostatic attraction between the marking fluid and the record sheet.

The record sheet and the marking fluid stream are relatively moved in a direction normal to the direction of the stream, while, in the case of general oscillograph work or code signalling, the deflection of the stream is made normal to both the direction of the stream and the direction of motion, in consequence of which the recorder plots the wave form of the signal to be recorded. But in some cases it may be desired to produce a discontinuous signal record, that is, one showing the dots and dashes drawn linearly, with spaces therebetween. Such discontinuous recording is especially useful for picture and facsimile work, where the lines of recording are superposed and finally result in a complete image. To enable the production of such discontinuous recording is a further object of my invention, for which purpose the stream of marking fluid is interrupted from reaching the record sheet by electrostatic attraction exerted on the marking fluid, instead of being merely deflected. This interruption may be obtained by shattering the stream by strong electrostatic attraction, but I consider it preferable to interrupt the stream indirectly, rather than by a direct electrostatic pull away from the record sheet and toward the nozzle, and to do this I employ electrostatic attraction to deflect the stream, as before, but I permit the stream to reach the record sheet when flowing in one direction, and not when flowing in another direction. In simplest form it is merely necessary to position a baffle between the nozzle and the record sheet, and to provide an opening therein, through which the stream passes when properly directed, but from which the stream is readily deflected by electrostatic attraction exerted normally of the stream.

The recorder, when employed for code signalling, is provided with the customary speed control means for the tape puller, the object of which is to permit the operator to so adjust the speed of the tape that the dots and dashes are plotted out in reasonable proportion. The present recorder is primarily a very high speed recorder, but it is desirable that it be adapted also to the reception of slow speed signalling, should such signalling be received. It is not feasible with this recorder to simply slow up the tape, for the difference in speed is then so great that the tape is excessively flooded with ink, which blots and obscures the signal. On the other hand, if the tape is run sufficiently fast to obtain clean cut lines the dots and dashes become entirely too long to be read with ease. To overcome these difficulties, and to adapt my recorder, or any very high speed recorder, for exceedingly slow speed signalling, is a still further object of my invention, which I do by adding to the slow speed signalling energy other locally supplied alternating energy having a frequency considerably greater than the signalling frequency, and then feeding the combined energy to the recorder. This permits the operator to slow up the tape, and thus results in a signal consisting of closely spaced alternations the axis of which follows the signal energy. In practice the arrangement results in a tape consisting of practically solid blocks of signal indications which are exceedingly easy to read.

Other difficulties arise because of the high speed operation of this recorder. One of these is the fact that the tape is inked so fast that there is insufficient time for the ink to dry. To overcome this difficulty is also an object of my invention, which I do by warming the ink, preferably by heating a platen over which the tape is running, so that it may be warmed both before, during, and after inking.

Furthermore I find the use of special inks advisable, the addition of wax or soap helping to prevent the stream from breaking up into drops. Wax is suitable if the tape is warmed, while soap is preferable if the tape is run cold.

The stream of ink or other marking fluid is exceedingly fine, being projected from a drawn nozzle, preferably glass, of very fine bore. A consequence is that should the recorder be stopped, the marking fluid will dry up and clog the nozzle. This is not a serious difficulty, when considering a more or less permanent shut down, because the tip of the nozzle is replaceable, and is exceedingly cheap. It may even be removed and placed in water to prevent clogging. However, the inconvenience of removing and replacing nozzles is to be avoided for ordinary shut downs occurring in normal operation, and to provide for these without permitting clogging of the nozzle is another object of my invention. For this purpose I cause a continuous flow of marking fluid through the nozzle, and I prevent contact of the marking fluid with the record sheet by baffling the fluid stream outside the nozzle without stopping the flow through the nozzle.

Should the tape stop moving, due to loss of current to the motor of the tape puller, the tape soon would be flooded with ink. Likewise, should the end of the roll of tape be reached, the platen and other mechanism of the recorder would be flooded. To prevent these occurrences is a further object of my invention, which I fulfill by providing baffle means movable into the path of the stream for deflecting and collecting the marking fluid without stopping the flow through the nozzle, together with means for automatically moving the baffle into the path of the stream upon cessation of motion of the record sheet, or upon reaching the end of the tape. Actually, of course, the baffle means now referred to may be the same as that which already was mentioned as manually operable to stop the stream when it is intentionally desired to stop recording.

A preferred modification of my invention is described in the following specification, which is accompanied by drawings in which Figure 1 is a wiring diagram explanatory of the principles underlying my invention; Figure 2 employs symmetrical electrodes; Figure 3 is a slight modification of the arrangement shown in Figure 2; Figure 4 is a further modification for causing electrostatic attraction between the record sheet and the marking fluid; Figure 5 is a plan view of the essential elements of a recorder constructed according to my invention; Figure 6 is an elevation of the arrangement shown in Figure 5; Figure 7 is a detail of the nozzle; Figure 8 shows the baffle in detail, and a wiring diagram for the control circuits of the recorder; Figure 9 represents a high speed tape; Figure 10 is a tape having a discontinuous signal record; Figure 11 illustrates a tape taken at a moderate speed; Figure 12 is a wiring diagram of the signalling circuit of the recorder, including apparatus for slow speed signalling; and Figure 13 is a slow speed tape.

Referring to Figure 1 it is seen that there is a nozzle 2, from which a stream of marking fluid 4 is projected on a tape 30. Alongside the stream there is positioned an electrode 6. The nozzle 2 imparts its electrical potential to the stream 4, and the nozzle and electrode 6 are given a difference in potential in response to the incoming signals being received on a line 8. I find that for high speed operation the arrangement best employs a rather high potential, of the order of magnitude of 500 volts, though, of course, no appreciable current or energy is used. In order to obtain the necessary voltage the received signal is amplified in one or more stages of electron emission tube amplification, indicated at 10. The amplifier stages, after the signal has been rectified, should preferably be resistance coupled in order to faithfully reproduce the received signal. Various expedients already known for blocking off or improving the squareness of the wave form of the signal may be resorted to.

The electrode 6 may be connected either to ground, as when the switch 14 is closed, or to the lower terminal of the output resistance of the stage 10, as when the switch 12 is closed. With the former arrangement there is an initial difference in potential between the nozzle 2 and the electrode 6, which is reduced when the control electrode of the tube is made more positive. With the latter arrangement, however, the potential difference between the stream and the electrode 6 is increased when the control electrode of the tube is made more positive, and in this case the tube is preferably biased to cut off, so that normally no anode current flows, and no difference in potential exists between the stream and the electrode 6. The circumstances under which these two circuits are respectively given preference are dealt with subsequently.

Figure 2 is a modification of Figure 1 arranged with symmetrical circuits and electrodes. As before, there is a nozzle 2, from which is projected a stream of marking fluid 4. On either side of the stream are situated the electrodes 6 and 16. In this case the wire line 8 is coupled to a push-pull amplifier stage 20. The electrodes 6 and 16 are connected to the output impedances 22 and 24, while the mid point is connected to a source of anode potential.

The nozzle 2 is grounded, completing the circuit in a manner analogous to that obtained in Figure 1 when the switch 14 is closed. It will be noticed that in this arrangement the control electrodes of the tubes are not biased, so that considerable anode current flows, normally, but upon either tube being biased more negative, its anode current is decreased, thereby decreasing the potential difference on one side of the stream, and permitting it be deflected toward the opposite side. If the amplifier stage 20 is operated with normal pushpull operation, so that there is an equal difference in potential between the electrode 6 and the stream 4, and between the electrode 16 and the stream 4, no deflection will result, for the attraction will be equal in both directions. It is therefore necessary to bias the preceding pushpull amplifier stage to cut off, so that current flows through only one of its tubes, that which is biased positively by the incoming signalling energy, at a time.

Figure 3 is quite similar to the arrangement shown in Figure 2, except that in this case the nozzle 2 has been connected between the impedances 22 and 24, thereby making the circuit analogous to that which is obtained in Figure 1 by closing the switch 12. Furthermore, the control electrodes of the tubes in the stage 20 are biased to cut off by a source of potential connected to the lead 26, so that current flows through only that tube which is biased positively by the incoming signal energy, and therefore only one of the electrodes 6 and 16 is excited at a time. In this case the stream is deflected toward that electrode connected to the tube which has been made conductive.

The arrangement shown in Figure 3 has two advantages over that shown in Figure 2. The first is that it makes possible in a very simple manner a modified circuit which will be described in connection with Figure 4. The second is that should limiting be desired, in order to obviate the effect of small disturbances of less magnitude than the signal, the negative bias employed may be increased above that necessary merely to stop anode current from flowing, and sufficiently to prevent response to minor stray signals. On the other hand, the arrangement shown in Figure 2 has an advantage in case the source of anode potential is not constant, for fluctuations in anode potential do not affect the operation of the circuit shown in Figure 2, while they may affect that shown in Figure 3, since the proper cut-off bias depends upon the applied anode potential.

For example, assume in Figure 3 that the upper tube of the stage 20 is biased positively by the incoming signal. Then the electrode 16 is made negative, relative to the nozzle 2, but the electrode 6 is at the same potential as the nozzle 2 because no current is flowing through the anode impedance 22, hence the stream is deflected toward the electrode 16.

To prevent splashing it is desirable to provide electrostatic attraction between the record sheet and the marking fluid, and an arrangement for this purpose is shown in Figure 4, which, it will be seen from inspection, is exactly like the arrangement shown in Figure 3, except for the following additions. Behind the record sheet 30 there is placed a platen 32, and this platen is connected by a lead 34 to ground, or to the lower terminal of the anode potential source 36. With this arrangement the normal anode potential is also the potential difference between the nozzle 2 and the record sheet 30, while the deflecting potential difference, applied to either the electrode 6, or the electrode 16, is some intermediate amount depending upon the amount of current flowing through the anode impedance of the tube.

It should be understood that in each of the figures so far described the incoming signal energy may be amplified in a number of stages before being applied to the final stage 20. These preceding amplifier stages may, except for the arrangement shown in Figure 2, be single tube stages, as well as pushpull stages, and need not be biased to cut off.

The signal circuits having been considered, the mechanical arrangement of the recorder will next be described. For this purpose reference is made to Figures 5 and 6, in which it will be seen that there is a nozzle 2, and a pair of electrodes 6 and 16. The electrodes are insulated from one another, and from the nozzle supporting mechanism, and are adjustable in their supporting pillars. The nozzle is pointed in a horizontal direction toward a tape 30, which is pulled by a tape puller 40 over guide pulleys 34, and, if the arrangement shown in Figure 4 is to be employed, also over a platen 36.

The details of the nozzle are shown in Figure 7 in which a drawn tube 2 of fine bore, preferably made of glass, is fixed to a small brass fitting 50 by sealing wax or other sealing material 52, which in turn is clamped to the main barrel 54 by a threaded bushing 56. The end of the bushing presses upon the flange of the fitting 50. Between the fitting and the barrel 54 a filter disk, 57, is inserted, to prevent impurities from clogging up the nozzle 2.

Reverting to Figures 5 and 6, the barrel 54 is fixed to a universal mounting, permitting it, by means of worm screw and worm gear arrangements 58 and 60 to be elevated and traversed for suitable adjustment in order to project the stream accurately in the desired direction.

The barrel of the nozzle is fed with ink through an axial tube 80, the supply being from a tank 82 through a connecting tube 84. The fluid in the tank 82 is kept under pressure, say 15 to 20 pounds per square inch, though pressures as high as 150 pounds per square inch have been used, through a pipe 86, leading to a pressure tank or a small pressure pump. The total displacement of ink over a long period of use is so small that a pressure tank system similar to those used for oxygen tanks is quite convenient, the pressure being adjusted by the usual pressure regulating valve.

In the path of the stream there is interposed a trough 62, provided with a rectangular opening 64, through which the stream normally passes, and a baffle plate 66 for closing up the rectangular opening when it is desired to interrupt the stream. The marking fluid is collected by the trough 62, and led through a drain tube 68 to a suitable collection tank. The baffle 66 is pivoted at 70, and provided with an armature 72, which is attracted by a magnet 74 when it is desired to remove the baffle from across the opening. The open position of the baffle may be adjusted by a stop screw 76.

The baffle 66 is shown more in detail in Figure 8, in which it will be seen that the baffle is affixed to an armature 72, which is pivoted at 70, and arranged to be attracted by an electromagnet 74. When the magnet is energized the baffle is in dropped position, in which case the recorder is operative. If the baffle 66 is so fixed, by the fastening means 100, that the rectangular window 64 in the trough 62, in Figures 5 and 4, is located as shown by the dotted rectangle numbered 64 in Figure 8, the tape is marked with the wave form of the signal wave, as is indicated on the tape 30. However, if a discontinuous record is desired the baffle 66 may be moved over, relative to the armature 72, until the rectangular window is located as is indicated by the rectangle numbered 64', and the tape 30', in which case the baffle, when in dropped position, instead of being completely out of the way of the window 64', presents a raised portion 102, with a slot 104 cut through it. This provides discontinuous recording, owing to the fact that the stream, when deflected, no longer coincides with the slot 104.

Figure 8 also indicates the control wiring of the recorder. Energy is fed from a supply main 114 to a switch 118 the closing of which energizes the control circuits and causes rotation of the tape puller motor 112. The speed of the motor is adjustable, the adjustment being obtained here simply by a series rheostat 120, though actually the variable resistance is inserted in series with the armature only of the motor. Furthermore, many tape pulling mechanisms also include gear shifts to provide different ranges of speed, for a given range of motor speed. The magnet 74 is connected across the motor supply, so that it is energized upon actuation of the motor, and opens the baffle 66. Should the switch 118 be opened, or the supply of current to the motor fail for any reason the magnet 74 is automatically deenergized, and the baffle 66 under influence of the restoring spring 126, intercepts the ink stream. The amount of motion upwards of the baffle may be adjusted by adjustment of a stop screw 128.

The magnet 74 is connected in series with a relatively high resistance 106, and connected across the magnet itself, but not across the resistance 106, is a circuit including the guide wheel 34 and a spring contactor 110. In case the end of the tape is reached the spring 110 contacts with the wheel 34, thereby shunting the magnet 74, and permitting the spring 126 to operate the baffle 66. The operation may also be controlled manually by means of a switch 108. It may incidentally be pointed out that heating current for heating the platen 36 is taken directly from the line beyond the switch 118, and the amount of heat produced in the unit 124 may be adjusted by an external resistance 122.

Attention is now directed to Figure 9, which shows a typical high speed tape, the record shown being taken at 3200 words per minute, though the estimated maximum is much higher, being about 12000 words per minute, and tapes at 8500 words per minute have already been taken.

Figure 10 shows a discontinuous record such as is obtained when the slotted baffle is used.

Figure 11 shows a tape taken at 150 words per minute, and it will be noticed how the top and bottom lines of the record have become heavier, owing to the relatively slower tape speed.

Figure 1:
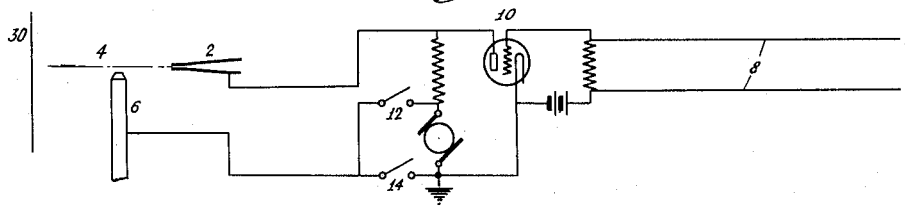
Figure 2:
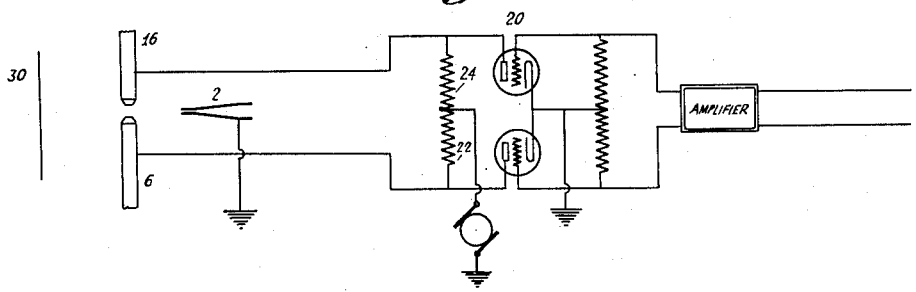
Figure 3:
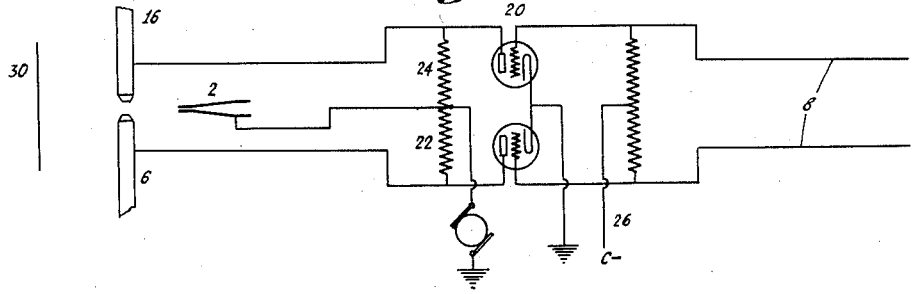
Figure 4:
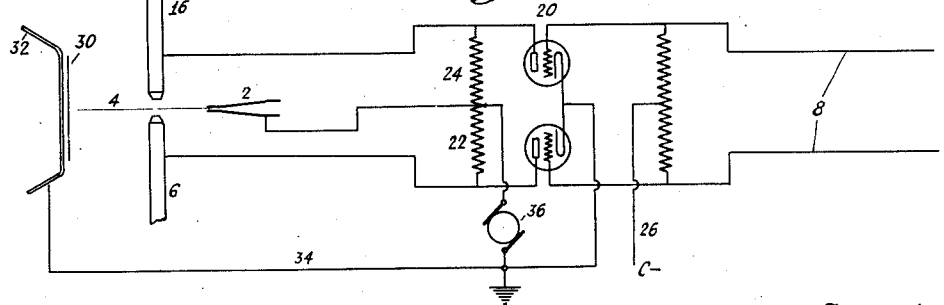

When the recording speed is slowed down to below 50 words per minute the tape is flooded, unless run so fast that the characters become unduly elongated. To take care of very slow recording speeds I provide additional apparatus indicated in Figure 12. Referring to that figure it will be seen that a local source of alternating current 130 is provided, and its frequency is chosen considerably greater than the signalling frequency. Upon receiving very slow signalling the operator not only slows up the tape, but also closes a switch 132, so as to feed the local energy through a transformer 134, to the input impedance. The local energy is thus added to the incoming energy, and their relative amplitude may be adjusted by adjustment of the resistances 138. This amplitude may be made about equal to the signal amplitude, in which case the signal record consists of solid blocks located above and below a longitudinal axis. Such a signal is indicated in Figure 13, which shows a slow speed tape, recorded at about 25 words per minute.

Figure 12 discloses a further feature in the inclusion of high resistances 140, the object of which is to insure safety to the operator, for the voltages used may be as high as 500 or even 1000 volts. No appreciable current is drawn by the electrodes, so that the high resistances do not affect the normal operation of the circuits, but in the event of an accidental short circuit, or bodily contact, the resistances serve to produce so high a potential drop upon flow of appreciable current that safety is insured.

The paramount feature of the invention resides in its practically inertialess operation, resulting from controlling a very fine stream by electrostatic attraction. This idea is equally applicable to a stream of any sort of chemical intended to cooperate with a specially treated record sheet, and is also applicable to a hot air stream cooperating with a heat sensitive paper for pyro-recording. Likewise, a tiny jet of flame may be produced by a nozzle, and the jet deflected or controlled by electrostatic attraction. I intend all such recording mediums to be included in the term "marking fluid" which I shall employ in the annexed claims.

It will also be understood that for general oscillograph work a wider tape may be employed than is needed for code signal recording, and that while I have illustrated a tape recorder, the invention is applicable to a regular picture or facsimile recorder, particularly when a discontinuous record is used. In such a machine the record sheet may be moved sideways for each scanning line, and also be gradually moved upwards for the successive scanning lines. Often in such machines the record sheet is kept stationary, except for a gradual successive scanning line movement upwards, while the marking device is reciprocated across the record sheet to record the individual scanning lines. It is obvious that there is no essential difference between an arrangement in which the nozzle and electrode system is moved, relative to the record, instead of vice versa, and I therefore intend, in the claims which follow, that such claims as call for a moving record sheet, or means to move a record sheet, be construed broadly to include cases where the nozzle is moved relative to the record sheet, as well as vice versa.

It goes without saying that my recorder is applicable to cable communication as well as to radio communication. It is also exceedingly valuable for recording monitoring signals taken near a transmitting station to check the transmission. At the present time such monitoring is either of two types, one in which an ordinary siphon recorder is employed, and which is designed solely to check the accuracy of the signals being transmitted, that is, the reliability of the operators typing the perforated tape used with machine transmitters, and other such major factors, and the second in which a regular oscillograph record taken for the purpose of checking up on modulation, relay chatter, shape of the signal wave, and other detailed factors to which a siphon recorder is unable to respond. The present recorder may be used to monitor for either purpose.

I claim:

1. The method of recording electrical energy which includes projecting a stream of marking fluid on a record sheet, and controlling the stream by electrostatic attraction exerted transverse to and directly on the marking fluid in accordance with the energy to be recorded.

2. The method of recording electrical energy which includes projecting a stream of marking fluid on a record sheet, and deflecting the stream by electrostatic attraction exerted in accordance with the energy to be recorded.

3. The method of recording signals which includes projecting a stream of marking fluid on a moving record sheet, and deflecting an unsupported portion of the stream by electrostatic attraction exerted directly on the unsupported stream in accordance with the signal to be recorded.

4. The method of recording signals which includes projecting a stream of marking fluid on a moving record sheet, deflecting the stream in one direction normal to the direction of movement of the record sheet in response to signal impulses of one polarity, and deflecting the stream in the opposite normal direction in response to signal impulses of opposite polarity, by electrostatic attraction exerted directly on the stream.

5. The method of recording signals on a record sheet which includes continuously attracting a stream of marking fluid to a record sheet by electrostatic attraction and subjecting the stream to an electrostatic field varying according to signals to be recorded.

6. The method of recording signals which includes attracting a stream of marking fluid to a record sheet by electrostatic attraction, and deflecting the stream in accordance with the signal impulses to be recorded by electrostatic attraction exerted on the stream in a direction normal to the flow of the marking fluid.

7. The method of producing a discontinuous signal record which includes causing a stream of marking fluid to flow continuously toward a record sheet, and interrupting the flow of the stream to the record sheet by exerting electrostatic attraction directly on the marking fluid to deflect the stream in accordance with the signal to be recorded.

8. The method of producing a discontinuous signal record which includes causing a continuous stream of marking fluid to flow toward a record sheet, deflecting the stream by electrostatic attraction exerted thereon in accordance with the signal to be recorded, permitting the stream to reach the record sheet when flowing in one direction, and preventing the stream from reaching the record sheet when flowing in another direction.

9. In the operation of a recorder comprising a record sheet, a source of marking fluid, and means including a fine bore nozzle for projecting a stream of the marking fluid on the record sheet, the method of preventing clogging of the nozzle due to drying of the marking fluid therein when not recording, which includes causing a continuous flow of marking fluid through the nozzle, and preventing contact of the marking fluid with the record sheet by baffling the stream outside the nozzle without stopping the flow through the nozzle.

10. In the operation of a recorder comprising a moving record sheet, a source of marking fluid, and means including a fine bore nozzle for projecting a stream of the marking fluid on the moving record sheet, the method which includes causing a continuous flow of marking fluid through the nozzle, and automatically preventing contact of the marking fluid with the record sheet by baffling the stream outside the nozzle upon cessation of motion of the record sheet.

11. In the operation of a recorder comprising a moving record tape, a source of marking fluid, and means including a fine bore nozzle for projecting a stream of the marking fluid on the moving tape, the method which includes causing a continuous flow of marking fluid through the nozzle, and automatically preventing flow of the marking fluid stream by baffling the stream outside the nozzle upon reaching the end of the tape.

12. The method of recording slow speed signals on a high speed recorder which includes adding to the slow speed signal energy alternating energy of considerably greater frequency, and feeding the combined energy to the recorder.

13. The method of recording slow speed signals in a high speed recorder which includes adding to the slow speed signal energy alternating energy having a frequency considerably greater than the signalling frequency, projecting a stream of marking fluid on a record sheet, and deflecting an unsupported portion of the stream by electrostatic attraction exerted thereon in accordance with the combined electrical energy.

14. An electrical energy recorder comprising means to project an unsupported stream of marking fluid on a record sheet, and means to control the stream by electrostatic attraction exerted directly on the marking fluid in accordance with the energy to be recorded in order to produce recordings on the record sheet.

15. An oscillograph for recording electrical energy comprising means to project a stream of marking fluid on a record sheet, and means to deflect the stream by electrostatic attraction exerted in accordance with the energy to be recorded.

16. A signal recorder comprising means to project a stream of marking fluid on a record sheet, means to move the record sheet, and means to deflect an unsupported portion of the stream by electrostatic attraction exerted directly on the unsupported stream in accordance with the signal to be recorded.

17. A signal recorder comprising means to project a stream of marking fluid on a record sheet, means to move the record sheet, means to deflect the stream in one direction normal to the direction of movement of the record sheet by electrostatic attraction exerted directly on the stream in response to signal impulses of one polarity, and means to deflect the stream in the opposite normal direction by electrostatic attraction exerted directly on the stream in response to signal impulses of opposite polarity.

18. A signal recorder comprising a record sheet, a source of marking fluid, means to attract continuously the marking fluid to the record sheet by causing electrostatic attraction therebetween and means for electrostatically deflecting the stream in accordance with signals to be recorded.

19. A signal recorder comprising a record sheet, a source of marking fluid, means to direct a stream of marking fluid toward the record sheet, means to attract the marking fluid to the record sheet by causing electrostatic attraction therebetween, and means to deflect the stream by normally directed electrostatic attraction exerted thereon in accordance with the signal impulses to be recorded.

20. A signal recorder for producing a discontinuous signal record comprising means to support a record sheet, a source of marking fluid, means to cause a stream of the marking fluid to flow toward the record sheet, and means to interrupt the flow of the stream to the record sheet by electrostatic attraction exerted transverse to and directly on the marking fluid in accordance with the signal to be recorded.

21. A signal recorder for producing a discontinuous signal record comprising means to support a record sheet, a source of marking fluid, means to cause a continuous stream of marking fluid to flow toward the record sheet, means to deflect the fluid stream by electrostatic attraction exerted thereon in accordance with the signal to be recorded, and means for permitting the stream to reach the record sheet when flowing in one direction and for preventing the stream from reaching the record sheet when flowing in another direction.

22. A recorder comprising means to support a record sheet, a source of marking fluid, means including a fine bore nozzle for projecting a stream of the marking fluid on the record sheet, and baffle means arranged to be moved between the nozzle and the record sheet for deflecting and collecting the fluid stream in order to stop recording without stopping the flow of fluid through the nozzle.

23. A recorder comprising means to support a record sheet, means to move the record sheet, a source of marking fluid, means including a fine bore nozzle for projecting a stream of the marking fluid on the moving record sheet, baffle means immovable into the path of the stream for deflecting and collecting the marking fluid without stopping the flow through the nozzle, and means for automatically moving the baffle into the path of the stream upon cessation of motion of the record sheet.

24. A recorder comprising means to support a record tape, means to move the tape, a source of marking fluid, means including a fine bore nozzle for projecting a stream of the marking fluid on the moving tape, baffle means movable into the path of the stream for deflecting and collecting the marking fluid without stopping the flow through the nozzle, and means for automatically moving the baffle means into the path of the stream upon reaching the end of the tape.

25. An arrangement for adapting a high speed recorder to slow speed signalling comprising the high speed recorder, a local source of alternating energy having a frequency considerably greater than the signalling frequency, means to add the local energy to the incoming slow speed signalling energy, and means to feed the combined energy to the high speed recorder.

26. A slow and high speed recorder comprising means to support and move a record sheet, a source of marking fluid, means to project a stream of the marking fluid on the record sheet, a source of signal energy, a local source of alternating energy having a frequency considerably greater than the signalling frequency, means to add the signal and local energies during slow speed signalling, and means to deflect an unsupported portion of the stream by electrostatic attraction exerted thereon in accordance with the combined energy.

27. A recorder comprising means to support a record sheet, a fine bore nozzle, a reservoir of marking fluid, means to force marking fluid from the reservoir through the nozzle toward the record sheet, an electrode positioned adjacent the path of the marking fluid between the nozzle and record sheet, and means to cause a potential difference between the nozzle and electrode in accordance with the signal to be recorded.

28. A recorder comprising means to support a record sheet, a fine bore nozzle, a reservoir of marking fluid, means to force a stream of the marking fluid from the reservoir through the nozzle toward the record sheet, a pair of electrodes positioned on opposite sides of the path of the marking fluid between the nozzle and the record sheet, a pushpull amplifier the output circuit of which is so coupled to the nozzle and the electrodes as to cause a potential difference between the latter and the former, means for applying signal energy to the input circuit of the amplifier, and means to so bias the control electrodes of a stage of the amplifier that the tubes are made conductive only alternately.

29. In a signalling system, means for producing an unsupported recording stream and means for subjecting the stream to a field varying in intensity according to desired signals whereby the stream is deflected according to the variations in intensity of the field.

30. In apparatus of the character described, the combination of an electron discharge device having input and output electrodes, an impedance and a potential source coupled to the output electrodes, means for applying variable potentials to the input electrodes of said device, means for producing a recording stream, and means for varying the recording stream in accordance with the current flow through said impedance as the potentials on the input electrodes of said device are varied.

31. In combination, in apparatus of the character described, an electron discharge device having input and output electrodes, an impedance and a source of potential coupled to the output electrodes of said device, means for subjecting the input electrode of said device to variable electrical potentials, means for producing a recording stream, and means for deflecting the stream in accordance with the variable current through said impedance as the potentials on said input electrodes are varied.

32. In apparatus of the character described, the combination of an electron discharge device having input and output electrodes, an impedance and a source of potential coupled to the output electrodes, means for subjecting the input electrodes of said device to variable potentials whereby the current flow through said output impedance is varied, a recording stream, and means for subjecting the stream to a field derived from the flow of current through said impedance whereby the stream is varied in accordance with the potentials supplied to the input electrodes of said electron discharge device.

33. In apparatus of the character described, an electron discharge device having input and output electrodes, an impedance and a source of potential connected to the output electrodes, means for subjecting the input electrodes of the device to predetermined variable electrical potentials, a recording stream, and means for utilizing the variable current flow through said output impedance as the voltages on said input electrodes are varied in order to deflect said recording stream electrostatically.

34. In apparatus of the character described, a pair of pushpull connected electron discharge devices, means for applying to the input electrodes thereof predetermined variable potentials, an impedance coupled to the output electrodes of said devices, a recording stream, and means for varying the recording stream in accordance with the current flow through said impedance as the potentials on said input electrodes are varied.

35. In apparatus of the character described, a pair of pushpull connected electron discharge devices, means for subjecting input electrodes thereof to variable potentials of predetermined value, an impedance associated with the output electrodes thereof, a recording stream, and means for subjecting said stream to a field varying in intensity in accordance with the current flow through said impedance as said input potentials are varied whereby said stream is deflected in accordance with said input potentials.

36. In apparatus of the character described, a fine bore nozzle, means for forcing a stream of recording fluid therethrough, an electron discharge device having input and output electrodes, a source of potential and an impedance coupled to the output electrodes thereof, means for subjecting the input electrodes of said device to variable potentials of predetermined value, and means for subjecting said stream to a field derived from the current flow through said impedance whereby said stream is deflected in accordance with the potentials applied to the input electrodes of said device.

37. In apparatus of the character described, the combination of a fine bore nozzle, means for forcing marking ink therethrough whereby a fine stream of marking ink is projected through space, an electron discharge device having input and output electrodes, a source of potential and an impedance connected to the output electrodes of said device, means for subjecting the input electrodes of said device to variable electrical potentials, whereby the current flow to said impedance is varied, and means responsive to said current flow for subjecting said stream of marking ink to an electrostatic field whereby said stream is deflected in accordance with the potentials applied to said input electrodes.

38. In combination, a pair of pushpull connected electron discharge devices, an impedance connected across the output electrodes thereof, a source of potential connected to an intermediate point on said impedance, means for producing a recording stream, a relatively high resistance connecting said means to a point intermediate said impedance, electrodes adjacent the recording stream produced by said stream producing means, resistances connecting said electrodes to electrodes of said pushpull connected devices, and means for impressing variable potentials on the input electrodes of said devices whereby said recording stream is deflected electrostatically by said electrodes adjacent said stream.

39. In combination, an electron discharge device, an impedance and a source of potential connected to an output electrode thereof, means for subjecting input electrodes of said device to relatively low frequency energy, means for simultaneously subjecting said input electrodes to relatively high frequency electrical potentials, a recording stream, and means for subjecting said recording stream to an electrical field varying in accordance with the resultant current flow through said impedance as produced by the combined potentials applied to said input electrodes.

40. In combination, an electron discharge device having input and output electrodes, a source of potential and an impedance serially connected to the output electrodes of said device, means for subjecting input electrodes of said device to relatively low frequency potentials, means for simultaneously subjecting input electrodes of said device to relatively high frequency potentials, a recording stream, and means for electrostatically deflecting said stream in accordance with the current flow through said impedance as produced by the combined potentials to which said input electrodes are subjected.

41. In combination, a pair of pushpull connected electron discharge devices, means for subjecting input electrodes thereof to both high and low frequency potentials simultaneously, an impedance and a source of potential coupled to the output electrodes of said pushpull connected devices, a recording stream, and means for subjecting said stream to a field in accordance with the current flow through said impedance produced by the combined potentials applied to the input electrodes of said devices whereby said stream is varied in accordance with the combined input potentials.

42. In combination, a pair of pushpull connected electron discharge devices, means for simultaneously subjecting input electrodes thereof to high and low frequency potentials, an impedance and source of potential connected to the output electrodes of said devices, means for producing a recording stream connected to a point intermediate said impedance, and electrodes adjacent the stream connected to points on said impedance on either side of said first mentioned connecting point whereby said stream is deflected electrostatically in accordance with the potentials applied to the input electrodes of said electron discharge devices.

43. An electrical energy recorder comprising an electron discharge device having input and output electrodes, an impedance associated with an output electrode thereof, means associated with the input electrodes thereof to vary the flow of current through said impedance in accordance with the energy to be recorded, means for subjecting an unsupported stream of marking fluid on a record sheet, and means responsive to the current flow through said impedance for electrostatically varying the marking fluid in accordance with the energy to be recorded in order to produce recordings on the record sheet.

44. Apparatus for recording electrical energy comprising an electron discharge device having input and output electrodes, an impedance and a source of potential connected to the output electrodes, means for applying energy to be recorded to the input electrodes thereof whereby the current through said impedance is varied in accordance with the energy to be recorded, means for projecting a stream of marking fluid on a record sheet, and means responsive to the current flow through said impedance for deflecting the stream by electrostatic attraction whereby recordings are produced on said record sheet in accordance with the energy applied to the input electrodes of said electron discharge device.

45. Signal recording apparatus comprising an electron discharge device having input and output electrodes; means for applying signal potentials to input electrodes thereof, a source of potential and an impedance connected to output electrodes thereof whereby the current flow through said impedance varies in accordance with the applied signaling potentials, means for projecting a stream of marking fluid on a record sheet, means for moving the record sheet, and means responsive to the current flow through said impedance for deflecting an unsupported portion of the stream by electrostatic attraction exerted directly on the unsupported stream in accordance with the current flow through said impedance.

46. Signal recording apparatus comprising an electron discharge device having input and output electrodes, means for subjecting input electrodes thereof to signal potentials, an impedance and a source of potential connected to the output electrodes of said device whereby the current flow through said impedance is varied in accordance with the applied input signal potentials, means for projecting a stream of marking fluid on a record sheet, means for moving the record sheet, and means for subjecting an unsupported portion of the stream to a field derived from the current flow through said impedance whereby recordings are produced on the record sheet in accordance with the signaling potentials applied to the input electrodes of said electron discharge device.

47. Signal recording apparatus comprising a pair of pushpull connected electron discharge devices, means for applying signal potentials to input electrodes of said devices in phase opposition, an impedance and a source of potential connected to output electrodes of said devices, whereby current flows in different directions through said impedance depending upon which of said electron discharge devices are made conductive by the application of signaling potentials, means for projecting a stream of marking fluid on a record sheet, means to move the record sheet, means for deflecting the stream in one direction normal to the direction of movement of the record sheet by electrostatic attraction exerted directly on the stream in response to current flow in one direction through said impedance, and means for deflecting the stream in opposite normal direction by electrostatic attraction exerted on the stream in response to the current flow of impedance in the opposite direction.

48. In combination, in recording apparatus, a tape, means for driving the tape, a pair of electrical contacts separated by the tape and contacting in the absence of tape therebetween, means for projecting a stream of recording fluid in the path of the tape, a baffle, and means for moving said baffle into the path of the stream in the absence of tape between said contacts.

49. In recording apparatus, a tape, means for driving the tape, means for projecting a stream of marking fluid on the tape, a baffle normally in the path of the stream, means for electromagnetically moving the baffle out of the path of the stream whereby the stream impinges on said tape when said driving means is energized, a pair of electrical contacts separated by said tape and contacting in the absence of tape therebetween, and means responsive to contact of said contacts in the absence of tape to move said baffle into the path of the projected stream of marking fluid.

50. In combination in an arrangement for recording energy on a strip, means associated with said strip for driving same, and a pair of elements adapted to be separated by said strip, recording material, and means for projecting a stream of recording material onto said strip, means to control the distribution of said stream on said strip in accordance with signal energy, and a source of energy connected to said elements for affecting said stream.

51. Apparatus for recording signal energy on a strip having, in combination, a source of spraying material, a metallic element so located that the blank strip moves intermediate said element and said source of material, circuit means connected to said element for creating a difference in potential between said element and said material, and means for controlling the distribution of said material in accordance with said signal energy.

52. Apparatus for recording signal energy on a strip having, in combination, a source of spraying material, a metallic element so located that the blank strip moves intermediate said element and said source of material, a source of unidirectional potential connected to said element for creating a difference in potential between said element and said source of material, and means for controlling the distribution of said material in accordance with said signal energy.

CLARENCE W. HANSELL.